US005605347A

United States Patent [19]
Karlow et al.

[11] Patent Number: 5,605,347
[45] Date of Patent: Feb. 25, 1997

[54] AIRBAG MODULE WITH SIMPLIFIED CUSHION ATTACHMENT

[75] Inventors: James P. Karlow, Milford; Mohamed Boumarafi, Rochester Hills, both of Mich.

[73] Assignee: Takata, Inc., Auburn Hills, Mich.

[21] Appl. No.: 541,792

[22] Filed: Oct. 10, 1995

[51] Int. Cl.$^6$ ............................ B60R 21/20; B60R 21/30
[52] U.S. Cl. ......................... 280/728.2; 280/738; 248/99
[58] Field of Search ............................... 280/728.2, 732, 280/738, 739, 740, 743.1, 728.1; 248/99, 100, 101

[56] References Cited

U.S. PATENT DOCUMENTS

| | | | |
|---|---|---|---|
| 3,314,632 | 4/1967 | Freuler | 248/101 |
| 5,074,584 | 12/1991 | Jarboe | 280/728.2 |
| 5,096,222 | 3/1992 | Komerska et al. | 280/728.2 |
| 5,100,172 | 3/1992 | Van Voorhies et al. | 280/738 |
| 5,484,165 | 1/1996 | Jenkins et al. | 280/728.2 |
| 5,503,425 | 4/1996 | Emambakhsh et al. | 280/728.2 |

FOREIGN PATENT DOCUMENTS

| | | | |
|---|---|---|---|
| 447030A | 2/1991 | European Pat. Off. | 280/728.2 |
| 4-55148A | 2/1992 | Japan | 280/728.2 |
| 4-356247 | 12/1992 | Japan | 280/728.2 |
| 5-294203A | 11/1993 | Japan | 280/728.2 |
| 90/13457 | 11/1990 | WIPO | 280/728.2 |
| 93/08042 | 4/1993 | WIPO | 280/728.1 |

OTHER PUBLICATIONS

*Air Bag Reaction Canister with Locking Air Bag Door*, anonymous, Research Disclosure, Jan. 1995, No. 369.

*Primary Examiner*—Brian L. Johnson
*Assistant Examiner*—Peter C. English
*Attorney, Agent, or Firm*—Harness, Dickey & Pierce, PLC

[57] ABSTRACT

An airbag module for a motor vehicle incorporating simplified assembly features. The airbag module assembly includes a retainer bracket element having a series of protruding tabs. These tabs are passed through slits of the airbag material and also engage slots in the module housing. The components are oriented and dimensioned such that the retainer bracket elastically deforms during assembly and allows the tabs to engage the housing slots by snapping into position.

15 Claims, 2 Drawing Sheets

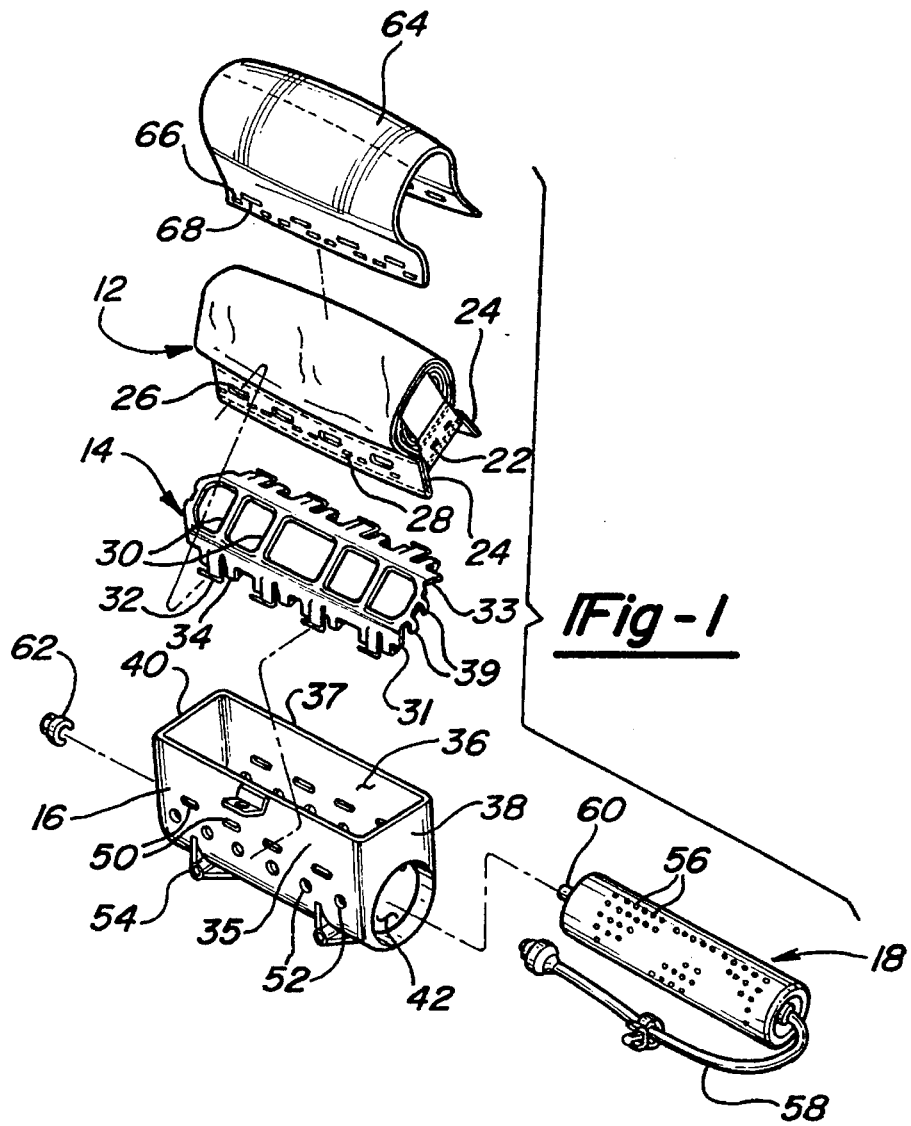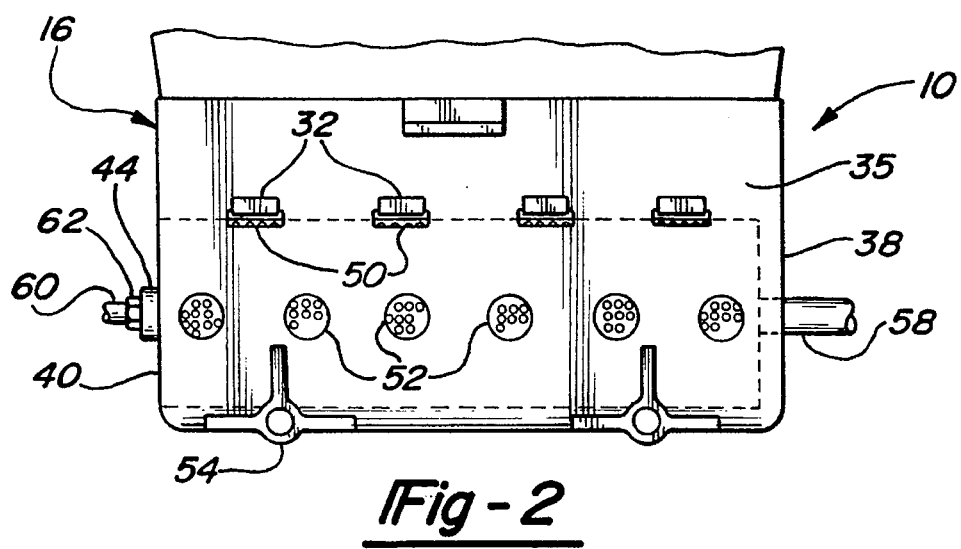

5,605,347

AIRBAG MODULE WITH SIMPLIFIED CUSHION ATTACHMENT

BACKGROUND AND SUMMARY OF THE INVENTION

This invention is related to a motor vehicle occupant impact protection device, and in particular, an airbag module having a simplified construction.

Air cushion restraint systems (ACRS) are in widespread use in motor vehicles today. These devices feature an airbag or air cushion which is inflated by gas emitted from an inflator which provides energy absorption for the motor vehicle occupant in the event of a vehicle collision. The occurrence of an impact is detected by on-board vehicle crash sensors. Airbag systems are often provided at the driver's-side of a motor vehicle, and are normally mounted to the vehicle steering wheel. Passenger-side front seat occupant airbags are also in use today. Most airbag restraint systems presently available are designed to provide impact protection for frontal vehicle impacts. More recently, airbags mounted to a vehicle door or seat are being designed and implemented to provide side impact protection for the occupants.

Designers of airbag restraint systems are constantly striving to enhance the quality of their product and reduce their cost, both in terms of component cost and assembly, while providing an exceptionally high level of quality and reliability.

The airbag module in accordance with the present invention provides for assembly ease through utilizing a limited number of components which assemble in a positive straightforward manner providing an efficient assembly process. The entire airbag module can be assembled using a single threaded fastener. The module features a tub-shaped housing or reaction container having a side opening. The folded cushion assembly is mounted to a retainer bracket having tabs which engage slots in the air cushion around its inflation opening. The sub-assembly of the cushion assembly and retainer bracket can be pushed into the side opening of the housing where the tabs of the retainer bracket engage with slots in the housing, thus providing a snap-fit assembly. The components interact in a manner which provides the structural integrity needed to withstand deployment and restraint loadings. This construction approach not only minimizes the number of components but avoids the necessity of using numerous threaded fasteners or formed fasteners such as rivets, or other post-assembly forming operations needed to secure the cushion assembly. This design also allows for a simplified mold design for the housing since the housing incorporates slots for the retainer bracket rather than needing features which would require more complex molding operation.

The airbag module in accordance with this invention can be used with pyrotechnic type inflators in which the inflation gases are generated through a chemical reaction, or so-called "hybrid" inflators which incorporate a pyrotechnic gas source used in conjunction with a volume of compressed gas. In addition, the module can incorporate venting and/or aspiration apertures within the reaction housing. The module may also be adapted for frontal or side impact protection.

Further objects, features and advantages of the invention will become apparent from a consideration of the following description and the appended claims when taken in connection with the accompanying drawings.

BRIEF DESCRIPTION OF THE DRAWINGS

FIG. 1 is an exploded pictorial view of the airbag module in accordance with this invention showing each of the principal components of the module.

FIG. 2 is a side elevational view of the completely assembled airbag module in accordance with this invention.

FIG. 3 is a cross-section pictorial view taken through the airbag module in accordance with this invention in an undeployed condition and further showing gas flow direction during initial deployment in a condition where deployment is interfered with.

DETAILED DESCRIPTION OF THE PREFERRED EMBODIMENT

Figure 3:
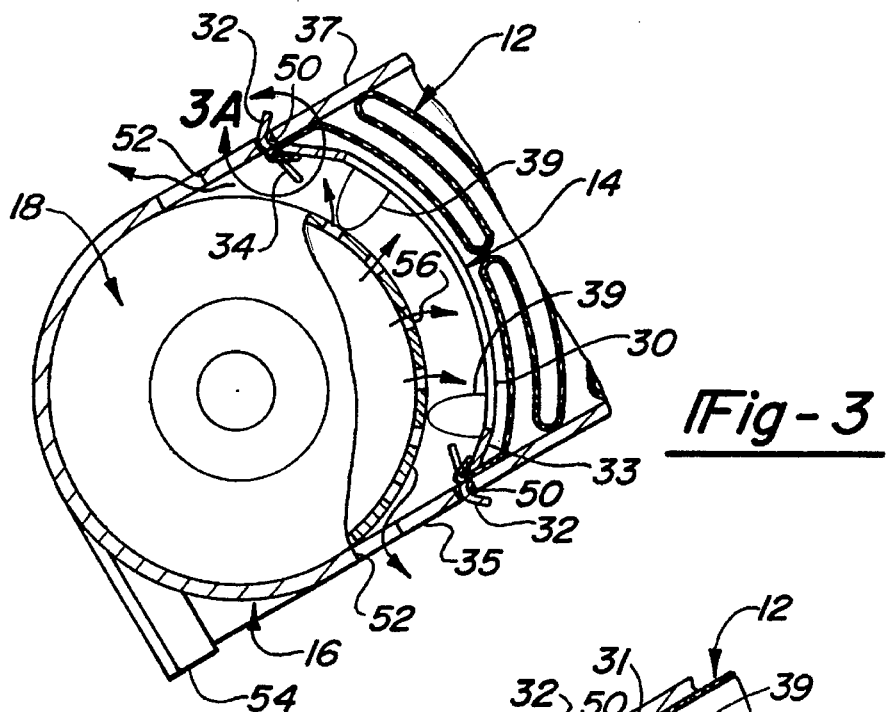

The airbag module assembly in accordance with this invention is shown in the Figures and is generally designated by reference number 10. Airbag module 10 includes as principal components, cushion assembly 12, retainer bracket 14, housing 16, and inflator 18.

Cushion assembly 12 is of generally conventional construction being comprised of a woven nylon, polyester or other material suitable for use as an air cushion fabric. As shown in FIG. 1, cushion assembly 12 is in a densely packed, folded condition. Cushion assembly 12 is sewn to provide an enclosed interior volume which receives inflator gases. An inflation opening or mouth 22 is provided and formed by opposing flaps 24. Each of flaps 24 features two rows of slits or holes including a first row of slits 26, and a second row of slits 28 which are positioned closer to the terminal edge of the flaps. In a preferred construction, flaps 24 would be formed by sewing together multiple thicknesses of air cushion material. The fabric forming cushion assembly 12 can be of a porous type, or alternatively can be coated to reduce porosity. In order to provide its energy absorption function, inflation gases are permitted to escape cushion assembly 12 after deployment. Such venting can be provided through the porosity of the cushion material or through incorporation of one or more vent apertures within the cushion. Alternatively, and as explained in more detail below, such venting function can be also achieved through apertures formed in module housing 16.

Figure 3A:
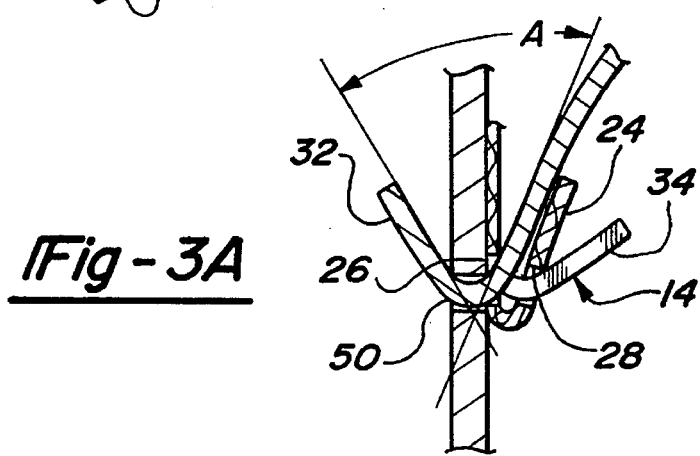
FIG. 3A is an enlarged cross-sectional view taken from FIG. 3 particularly showing the interrelation of the housing, cushion and retainer bracket.

Retainer bracket 14 shown in FIG. 1 can be formed of mild steel, for example of 0.8 mm thickness. Retainer bracket 14 defines a pair of elongated, opposed perimeter side edges 31 and 33 with ribs or webs 30 extending between them. At the opposing perimeter side edges a series of large and small tabs 32 and 34, respectively are formed. As shown in FIGS. 1 and 3A, tabs 32 are turned outwardly whereas tabs 34 are turned inwardly. The tabs are preferably bent such that an included angle of less than 90° is formed which is designated by angle A in the Figures. Tabs 32 and 34 alternate along the length of the retainer bracket perimeter side edges. Retainer bracket 14 can be elastically flexed by pushing perimeter side edges 31 and 33 together causing ribs 30 to assume an arcuate configuration. At the ends of bracket 14, tabs 39 are formed.

Housing 16 is a generally tub shaped enclosure which can be formed from stamping and welding operations, or alternatively could be of molded construction. Housing 16 defines a pair of side walls 35 and 37, and end walls 38 and 40. The walls define rectangular side opening 36. End wall 38 forms inflator mounting aperture 42, whereas end wall 40 features small bore 44. The two opposing side walls 35 and 37 feature a series of slots 50 oriented to receive retainer bracket tabs 32 for affixing retainer bracket 14 to housing 16. Housing 16 may also optionally incorporate apertures 52 as shown which are provided for aspiration or venting of the module as will be explained in more detail below. Housing 16 further defines mounting bosses 54 which enable the housing to be securely fastened to a structure within a motor vehicle. Protector cover 64 may be made of a Tyvek™ or similar material and is provided to wrap cushion assembly 12 to protect it from contamination and damage. Cover 64 has slits 66 and 68 which are aligned with cushion slits 28 and 26, respectively.

Inflator 18 can be of the solid pyrotechnic or hybrid variety. Inflator 18 has a series of inflation gas apertures 56 and further has a protruding signal wire 58 through which the deployment signal is sent. The opposite end of inflator 18 features a protruding threaded stud 60.

Assembly of airbag module 10 begins with attachment of cushion assembly 12 to retainer bracket 14. The cushion inflation opening flaps 24 are separated and the slits 26 and 28 of each flap are placed over the retainer bracket tabs 32 and 34, respectively. Tabs 32 are pushed through slits 26. In a similar fashion, tabs 34 are pushed through flap slits 28. Once assembled, cushion flaps 24 are attached to bracket 14 as shown in FIG. 3A. Since tabs 32 and 34 are bent in reverse or diverging directions (i.e. tabs 32 are outwardly bent whereas tabs 34 are inwardly bent), a strong connection between cushion assembly 12 and retainer bracket 14 is provided.

Next, protective cover 64 is wrapped over the folded cushion assembly 12 and affixed to bracket 14 by pushing tabs 32 and 34 through protective cover slits 68 and 66, respectively.

The next step in the assembly is to affix the sub-assembly comprising cushion assembly 12, retainer bracket 14, and cover 64 to housing 16. This sub-assembly is then inserted into housing side opening 36. The free undeformed width of bracket 14, measured at the extreme edges of tabs 32 is greater than the inside width of housing side opening 36. As bracket 14 is pressed into housing side opening 36, the terminal edges of tabs 32 engage the inside surface of housing 16, causing bracket 14 to become deflected to an arcuate configuration. Bracket 14 is pushed further into housing 16 until tabs 32 become aligned with housing slots 50 at which time they engage the slots and the retainer bracket 14 is allowed to at least partially spring back to its undeformed condition. Thus retainer bracket 14 snaps into the assembled condition which can be visually confirmed since tabs 32 protrude from slots 50. The condition of the elements is now that as best shown in the crosssection FIG. 3A. As is evident from the FIG. 3A, tabs 32 are oriented to keep the retainer bracket 14 and cushion assembly 12 retained under the significant loads during the deployment of the air cushion which primarily act in a direction pushing retainer bracket 14 and cushion assembly 12 out of housing side opening 36.

Completion of assembly occurs by passing inflator 18 through inflator mounting aperture 42 until threaded stud 60 passes through bore 44. At that point, nut 62 is threaded onto the stud thus locking inflator 18 within housing 16. Bracket tabs 39 engage inflater 18 to maintain a desired gap between the inflater and the cushion assembly, thus providing an unobstructed gas flow passageway and controlling post deployment heat transfer. Moreover, the interaction between inflator 18 and tabs 39 also prevents retainer bracket 14 from disengaging from housing 16 and reduces the possibility of rattling of the components.

In the deployment sequence, inflation is initiated by an electrical signal passing through signal wire 58 causing inflator 18 to produce gas. The gas begins to flow out of gas apertures 56 and through the plenum created between inflator 18 and retainer bracket 14. The gas flows through the open spaces between bracket webs 30 and into cushion assembly 12 which begins to fill causing cover 64 and the over-lying trim cover (not shown) to tear open, allowing the expanding cushion to pass into the vehicle interior. The engagement between tabs 32 and housing slots 50 enables retainer bracket 14 to withstand the significant loads exerted during the deployment sequence.

Figure 4:
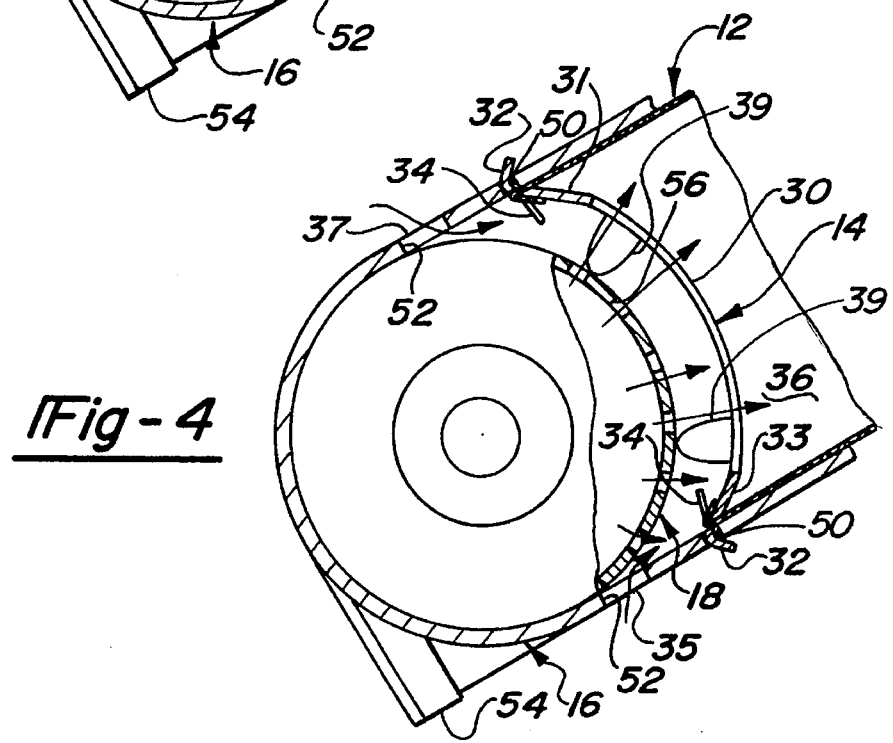
FIG. 4 is a cross-sectional view like that of FIG. 3 but showing the cushion assembly inflated and showing gas flow directions during normal deployment.

Venting of cushion assembly 12 can be accomplished through various traditional approaches such as providing vent holes cut into the cushion assembly fabric or through providing a desired level of fabric porosity. Venting can also be provided through holes 52 in housing 16. This approach to venting has the additional benefit of reducing forces on an out-of-position vehicle occupant. If the occupant blocks the deploying cushion, inflation gases can vent through housing apertures 52 as an alternate escape path rather than into the blocked still folded cushion. This condition is illustrated in FIG. 3 in which arrows show the direction of gas flow. In an unblocked normally deploying cushion, apertures 52 provide an aspiration air inlet. Thus the presence of apertures 52 allows outside air to assist in the inflation of air cushion assembly 12 which is drawn in by the low pressure area created by the high velocity escaping inflation gas. In this way the quantity of gas generating material within inflator 18 can be reduced to inflate an air cushion of given internal volume. The gas flow directions are shown for a normally inflating cushion in FIG. 4.

It is to be understood that the invention is not limited to the exact construction illustrated and described above, but that various changes and modifications may be made without departing from the spirit and scope of the invention as defined in the following claims.

We claim:

1. An airbag module for a motor vehicle for providing occupant protection comprising:

a cushion assembly formed of a foldable fabric and having an interior volume with an inflation opening formed by at least one edge flap having a plurality of mounting slits, an inflator for generating an inflation gas for said cushion assembly, a housing defining an interior volume and having an opening for receiving said cushion assembly, said housing further defining a series of slots and having means for receiving and retaining said inflator within said interior volume, and a retainer bracket having a perimeter edge with a plurality of protruding tabs, said retainer bracket dimensioned to be received within said housing opening causing deflection of said bracket, with said tabs passing through said cushion assembly flap mounting slits and said housing slots oriented to receive said tabs such that the interaction between said tabs and said housing attaches said cushion assembly to said housing.

2. An airbag module according to claim 1 wherein said housing having an inflator aperture separate from said housing opening for receiving said inflator.

3. An airbag module according to claim 2 wherein said housing having a bore and wherein said inflator having a threaded stud which passes through said bore such that said inflator is retained within said housing.

4. An airbag module according to claim 1 wherein said retainer bracket is positioned within said housing between said inflator and said cushion assembly.

5. An airbag module according to claim 1 wherein said housing further forms a plurality of aspiration apertures located adjacent said inflator thereby allowing air to enter said housing to assist said inflator in inflating said cushion assembly.

6. An airbag module according to claim 1 wherein said retainer bracket protruding tabs defining a first set of tabs and a second set of tabs and said cushion flap slits defining a first set of slits and a second set of slits for receiving said first and second sets of tabs respectively, and wherein said first and second sets of tabs being deflected in diverging directions.

7. An airbag module according to claim 1 wherein said tabs having terminal ends bent to an included angle of less than 90°.

8. An airbag module according to claim 1 wherein said retainer bracket being retained in engagement with said housing through elastic deflection of said bracket.

9. An airbag module according to claim 1 wherein said bracket further forming spacer tabs for contacting said inflator for providing a gap between said inflator and portions of said bracket.

10. An airbag module for a motor vehicle for providing occupant protection comprising:

a cushion assembly formed of a foldable fabric and having an interior volume with an inflation opening formed by at least one pair of flaps on opposite sides of said inflation opening, each of said flaps having a plurality of mounting slits, a generally cylindrical inflator for generating inflation gas for said cushion assembly, a tub shaped housing defining an interior volume and having a pair of opposing end walls with one of said end walls having an inflator receiving aperture and a pair of opposing side walls joining said end walls with said end and side walls forming a side opening, said housing side walls defining a series of slots, said housing inflator receiving aperture allowing said inflator to be inserted into said housing interior volume, and a retainer bracket of generally rectangular shape and formed of sheet metal stock, said retainer bracket having a pair of opposed edges having protruding tabs and having webs extending between said edges, said tabs oriented to pass through said cushion assembly flap mounting slits and said housing slots thereby attaching said cushion assembly to said housing with said cushion assembly disposed within said housing interior volume adjacent said side opening with said retainer bracket positioned between said inflator and said cushion assembly and said retainer bracket being in an elastically deformed condition within said housing thereby maintaining said tabs engaged with said housing slots.

11. An airbag module according to claim 10 wherein said housing having a bore and wherein said inflator having a threaded stud which passes through said bore such that said inflator is retained within said housing.

12. An airbag module according to claim 10 wherein said housing further forms a plurality of aspiration apertures located adjacent said inflator thereby allowing air to enter said housing to assist said inflator in inflating said cushion assembly.

13. An airbag module according to claim 10 wherein said retainer bracket protruding tabs defining a first set of tabs and a second of tabs and said cushion flap slits defining a first set of slits and a second set of slits for receiving said first and second sets of tabs respectively, and wherein said first and second sets of tabs being deflected in diverging directions.

14. An airbag module according to claim 10 wherein said tabs having terminal ends bent to an included angle of less than 90°.

15. An airbag module according to claim 10 wherein said bracket further forming spacer tabs for contacting said inflator for providing a gap between said inflator and portions of said bracket.

* * * * *

UNITED STATES PATENT AND TRADEMARK OFFICE
CERTIFICATE OF CORRECTION

PATENT NO. : 5,605,347
DATED : February 25, 1997
INVENTOR(S) : James P. Karlow
Mohamed Boumarafi It is certified that error appears in the above-indentified patent and that said Letters Patent is hereby corrected as shown below:

In column 5, line 41, Claim 10, after "said end" delete "wails" and insert --walls--.

Signed and Sealed this

Twentieth Day of May, 1997

Attest:

BRUCE LEHMAN

Attesting Officer

Commissioner of Patents and Trademarks